United States Patent [19]

Brons et al.

[11] Patent Number: 5,508,018
[45] Date of Patent: Apr. 16, 1996

[54] PROCESS FOR THE REGENERATION OF SODIUM HYDROXIDE FROM SODIUM SULFIDE

[75] Inventors: Glen Brons, Phillipsburg, N.J.; Ronald D. Myers, Calgary, Canada

[73] Assignee: Exxon Research and Engineering Company, Florham Park, N.J.

[21] Appl. No.: 433,913

[22] Filed: May 2, 1995

[51] Int. Cl.$^6$ ..................... C01D 1/04
[52] U.S. Cl. ........... 423/642; 423/183; 423/561.1; 423/657; 423/658; 585/469
[58] Field of Search ............ 585/469; 423/183, 423/561.1, 642, 657, 658

[56] References Cited

U.S. PATENT DOCUMENTS

| | | | |
|---|---|---|---|
| 458,563 | 9/1891 | Ellershausen | 423/642 |
| 2,164,141 | 6/1939 | Moore | 423/642 |
| 3,104,157 | 9/1963 | Kimberlin et al. | 423/642 |
| 4,105,441 | 8/1978 | Patel | 423/642 |
| 4,163,043 | 7/1979 | Dezael et al. | |
| 4,684,472 | 8/1987 | Abbe et al. | |
| 4,981,556 | 1/1991 | Hedblom et al. | 423/642 |

FOREIGN PATENT DOCUMENTS

| | | | |
|---|---|---|---|
| 101296-A | 4/1991 | Romania. | |
| 3044 | of 1863 | United Kingdom | 423/642 |
| 9112 | of 1890 | United Kingdom | 423/642 |

OTHER PUBLICATIONS

Chemical Abstracts 84:61600 (1984).

*Primary Examiner*—Wayne Langel
*Attorney, Agent, or Firm*—Estelle C. Bakun

[57] ABSTRACT

The present invention is directed toward a process for regenerating sodium hydroxide (NaOH) from aqueous solutions of sodium sulfide ($Na_2S$) comprising heating aqueous sodium sulfide in the presence of a metal selected from the group consisting of iron and cobalt, for a time and at a temperature sufficient to form a metal sulfide, sodium hydroxide and molecular hydrogen.

5 Claims, No Drawings

PROCESS FOR THE REGENERATION OF SODIUM HYDROXIDE FROM SODIUM SULFIDE

FIELD OF THE INVENTION

The present invention is directed toward regeneration of sodium hydroxide from aqueous solutions of sodium sulfide.

BACKGROUND OF THE INVENTION

In some current refinery operations, aqueous sodium hydroxide is used to scrub out sulfur from hydrogen sulfide and mercaptans in refinery streams generated by thermal cracking and/or hydrotreating-type refinery processes. The disposal of the resulting sodium sulfide solutions (spent caustic (NaOH)) is costly and environmentally detrimental. Current NaOH regeneration techniques are also costly. For example, Allied Signal's electro dialysis cell is expensive and requires the use of membranes. Some refineries abroad expend spent caustic by injecting it into deep wells. However, this is frowned upon in the United States. Thus, the spent NaOH is disposed of via more costly routes (e.g., burial).

Methods also exist for the regeneration of aqueous alkali metal hydroxide. See e.g., U.S. Pat. No. 4,163,043 discussing regeneration of aqueous solutions of Na, K and/or ammonium sulfide by contact with Cu oxide powder yielding precipitated sulfide which is separated and re-oxidized to copper oxide at elevated temperatures and an aqueous solution enriched in NaOH, KOH or $NH_3$. Romanian patent RO-101296-A describes residual sodium sulfide removal wherein the sulfides are recovered by washing first with mineral acids (e.g., hydrochloric acid or sulfuric acid) and then with sodium hydroxide or carbonate to form sodium sulfide followed by a final purification comprising using iron turnings to give insoluble ferrous sulfide.

Future feeds are expected to be more sulfur laden, yet allowable sulfur levels, in such feeds, are expected to be more stringent due to increasing environmental constraints. Hence, the increasing amounts of the sodium hydroxide used for desulfurization of such feeds will require efficient, economical regeneration.

SUMMARY OF THE INVENTION

The present invention is directed toward a process for regenerating sodium hydroxide (NaOH) from aqueous solutions of sodium sulfide ($Na_2S$) comprising heating aqueous sodium sulfide in the presence of a metal selected from the group consisting of iron, cobalt and mixtures thereof, for a time and at a temperature sufficient to form a metal sulfide, sodium hydroxide and molecular hydrogen.

The regenerated NaOH can be utilized for additional sulfur removal and the generated hydrogen for refining and/or upgrading of crudes.

DETAILED DESCRIPTION OF THE INVENTION

In accordance with the instant invention, sodium sulfide solutions are heated in the presence of a metal capable of forming a metal sulfide. The heating is conducted for a time and at a temperature sufficient to cause the metal to react with the sulfide solution and yield sodium hydroxide, metal sulfide and hydrogen. Heating temperatures may range from 380° C. to about 425° C., preferably 400° C. to about 425° C. and heating times from about 30 minutes to about 2 hours.

Applicants believe that the chemical pathway for the instant process, e.g., where iron has been chosen as the metal, follows the equation below.

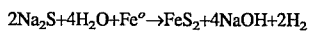

$$2Na_2S+4H_2O+Fe^o \rightarrow FeS_2+4NaOH+2H_2$$

The metals which can be utilized to desulfurize aqueous sodium sulfide include iron, cobalt or other effective metals which will yield a metal sulfide and sodium hydroxide when reacted with $Na_2S$, and mixtures thereof. The greater the surface area of the metal, the greater the conversion and selectivity to NaOH. Therefore, the metal will preferably have a particle size of 38 to about 1200 microns, more preferably the metal will have a particle size of about 50 to 150 microns. Most preferably, a metal powder will be utilized in the instant invention. The stoichiometry dictates that at least 1 mole iron, for example, must exist for every 2 moles of sodium sulfide. Once the NaOH has been regenerated, it can be easily harvested by methods known to those skilled in the art. For example, the hydrogen produced during the regeneration can simply be removed followed by NaOH removal.

Applicants believe that the process of desulfurizing benzo[b]thiophenes followed by regeneration of sodium hydroxide follows scheme 1.

Scheme 1:

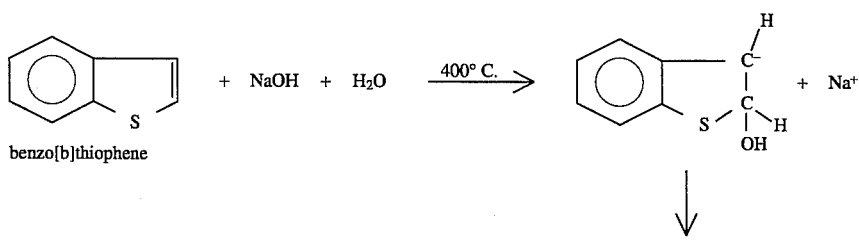

-continued
Scheme 1:

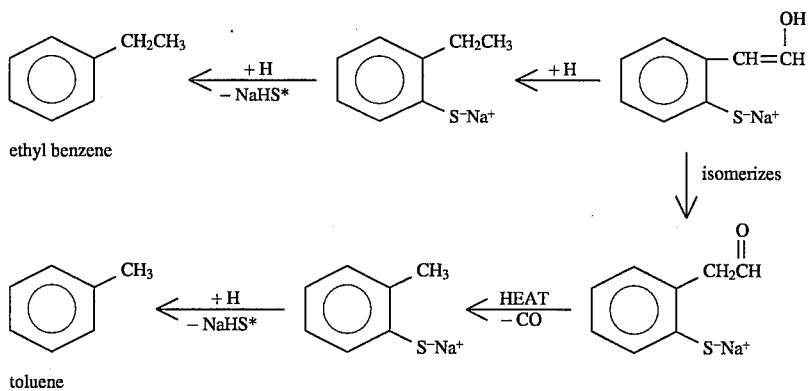

*Note: The initially generated sodium hydrosulfide (NaHS) in the presence of sodium hydroxide and water is converted to sodium sulfide (Na$_2$S):

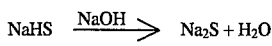

The following examples are for illustration and are not meant to be limiting.

EXAMPLES

Benzo[b]thiophene was subjected to a series of treatments with aqueous sodium sulfide. This was in an effort to generate NaOH and hydrogen in-situ to then do the NaOH desulfurization observed to occur via the pathways shown in Scheme 1. Those systems showed that in the presence of added molecular hydrogen and hydrogen donors (e.g., tetralin) that of the desulfurized products, there was more of an abundance of ethyl benzene over toluene due to the ability of the hydrogen to saturate the double bond of the intermediate vinyl alcohol. Without hydrogen present, more isomerization occurs to the aldehyde which then decarbonylates to yield toluene from benzo[b]thiophene.

Table 1 shows the data obtained for these reactions carried out without external hydrogen added (400° C. for 60 minutes). The data show that the addition of iron or cobalt increases the level of desulfurization and the selectivity to ethyl benzene. This is evidence that NaOH is generated as well as molecular hydrogen. Both conversion and selectivity also appear to be a function of the surface area of the metal, in that the more exposed metal surface, the more reaction to yield NaOH and hydrogen.

Table 2 provides some additional data using NaOH to treat benzo[b]thiophene. The addition of iron powder increased the levels of both conversion and selectivity indicating that some regeneration of the NaOH occurred in-situ to further desulfurize the compound and the increases in ethyl benzene to toluene ratio indicates that some hydrogen was present as well. Comparative data is provided for how effective the desulfurization can be when external hydrogen is added.

TABLE 1

Aqueous Sodium Sulfide Treatments of Benzo[b]thiophene (B[b]T) (400° C., 1.0 hr., 0.4 g B[b]T, 3.0 g 10% Aqueous Na$_2$S, 0.2 g metal)

| | Additive | | | |
|---|---|---|---|---|
| | None | Fe filings | Fe powder | Co powder |
| % Benzo[b]thiophene | 68.7 | 58.9 | 43.3 | 14.7 |
| % Toluene | 3.8 | 6.1 | 5.3 | 4.8 |
| % Ethyl benzene | 5.5 | 13.9 | 25.7 | 7.2 |
| % Phenol | 0.2 | | 0.2 | 0.5 |
| % o-ethyl phenol | 0.2 | | 0.1 | 0.6 |
| % o-ethyl thiophenol, sodium salt | 5.9 | 4.1 | 3.2 | 24.1 |
| % o-ethyl thiophenol, sodium salt | 11.1 | 14.5 | 18.8 | 44.8 |
| % "Heavy Ends" (products higher in MW than B[b]T) | 1.7 | 1.1 | 1.7 | 1.9 |
| % Conversion | 31.3 | 41.1 | 56.7 | 85.3 |
| % Selectivity | 31.6 | 48.9 | 55.4 | 15.4 |

TABLE 2

Aqueous Sodium Hydroxide Treatments of Benzo[b]thiophene (400° C., 1.0 H)

| | Additive | | |
|---|---|---|---|
| | None | Fe powder | Hydrogen |
| % benzo[b]thiophene | 10.9 | 5.9 | 0.2 |
| % toluene | 4.0 | 7.7 | 39.1 |
| % ethyl benzene | 1.8 | 7.1 | 57.5 |
| % phenol | 2.2 | 0.5 | <0.1 |
| % o-ethyl phenol | 1.7 | 0.9 | 0.4 |
| % o-methyl thiophenol, sodium salt | 47.7 | 33.3 | <0.1 |
| % o-ethyl thiophenol, sodium salt | 27.4 | 42.0 | <0.1 |
| % "heavy ends" (products higher in MW than B[b]T | 2.4 | 2.0 | 0.3 |
| % Conversion | 89.1 | 94.1 | 99.8 |

TABLE 2-continued

Aqueous Sodium Hydroxide Treatments of Benzo[b]thiophene (400° C., 1.0 H)

| | Additive | | |
|---|---|---|---|
| | None | Fe powder | Hydrogen |
| % Selectivity | 10.9 | 17.2 | 98.6 |

What is claimed is:

1. A process for regenerating sodium hydroxide from aqueous solutions of sodium sulfide comprising heating aqueous sodium sulfide in the presence of a metal selected from the group consisting of iron, cobalt and mixtures thereof, for a time and at a temperature sufficient to form a metal sulfide, sodium hydroxide and molecular hydrogen.

2. A process according to claim 1 wherein said temperature ranges from about 380° C. to about 425° C.

3. A process according to claim 1 wherein said time ranges from about 0.5 hours to about 2 hours.

4. A process according to claim 1 wherein said metal has a particle size of about 38 to about 1200 microns.

5. A process according to claim 1 wherein the ratio of said metal added to said sodium sulfide is one mole of metal to two moles of sodium sulfide.

* * * * *